(12) United States Patent
Dundas

(10) Patent No.: US 7,266,293 B1
(45) Date of Patent: Sep. 4, 2007

(54) HOSE FOR HOT LIQUIDS HAVING HEATING ELEMENT

(76) Inventor: Robert D. Dundas, 5306 W. Missouri, Glendale, AZ (US) 85301

( * ) Notice: Subject to any disclaimer, the term of this patent is extended or adjusted under 35 U.S.C. 154(b) by 406 days.

(21) Appl. No.: 10/837,850

(22) Filed: May 3, 2004

(51) Int. Cl.
*F24H 1/10* (2006.01)
*H05B 3/40* (2006.01)

(52) U.S. Cl. .............. 392/478; 392/465; 392/479

(58) Field of Classification Search ......... 392/465, 392/466, 478
See application file for complete search history.

(56) References Cited

U.S. PATENT DOCUMENTS

| | | | |
|---|---|---|---|
| 4,455,474 A | 6/1984 | Jameson et al. | |
| 4,553,023 A | 11/1985 | Jameson et al. | |
| 5,022,459 A | 6/1991 | Chiles et al. | |
| 5,182,147 A | 1/1993 | Davis | |
| 5,381,511 A | 1/1995 | Bahar et al. | |
| 5,428,706 A | 6/1995 | Lequeux | |
| 5,600,752 A | 2/1997 | Lopatinsky | |
| 5,698,278 A | 12/1997 | Emond et al. | |
| 5,713,864 A | 2/1998 | Verkaart | |
| 5,832,178 A | 11/1998 | Schave | |
| 5,862,303 A | 1/1999 | Adar et al. | |
| 5,974,227 A | 10/1999 | Schave | |
| 6,043,466 A | 3/2000 | Jenko et al. | |
| 6,049,658 A | 4/2000 | Schave et al. | |
| 6,109,826 A | 8/2000 | Mertes | |
| 6,148,147 A | 11/2000 | Durham | |

*Primary Examiner*—Thor Campbell
(74) *Attorney, Agent, or Firm*—Frank J. McGue

(57) ABSTRACT

A hose for pumping heated liquids therethrough is disclosed which has, in combination, an interior hose construction which is adapted to prevent kinking and collapse of said hose, a heating element which has abrasive protection layers associated therewith, an insulator, a moisture barrier and a safety and containment barrier. At least two hose fittings are positioned at each end of the hose with at least one of said hose fittings having electrical connections in electrical communication with the heating element and a source of electrical power.

18 Claims, 3 Drawing Sheets

HOSE FOR HOT LIQUIDS HAVING HEATING ELEMENT

TECHNICAL FIELD

This invention relates generally to the field of hoses used to pump hot liquids such as asphalt or plastics, and, more particularly, to an hose having a heating element contained therein.

BACKGROUND OF THE INVENTION

At present, hoses are often called upon to carry materials which need to be heated to be applied at a point of usage. Such heating can be required in a manufacturing process as, for example, in the plastics industry, or in road construction to pump asphalt to a desired location for application. At present, the majority of such hoses will utilize heating blanket technologies whereby the hose is wrapped with a heating element, typically an electric resistance heater of some sort. In addition, such hoses are often constructed using thin polytetrafluoroethylene tubes to allow for good flow of the liquids therethrough.

However, current technologies do suffer drawbacks. For example, the thin polytetrafluoroethylene tubes without inner support often kink. For support, present users add square lock liners which, themselves, do not support more than about 20 pound loads. In addition, heavy outer casings employed on such hoses are excessively heavy, are very stiff and do not insulate well resulting in injury to workers handling same.

U.S. Pat. No. 6,049,658 entitled "Flexible Hose for a Flowable Material Application" which issued on Apr. 11, 2000 to Schave et al. discloses a melter for asphalt including a heated hose 74 coupled to a supply line 72, a heating element and a sensor (FIG. 1).

U.S. Pat. No. 5,974,227 entitled "Hot Melt Mix Applicator with Electrically Heated Hose" which issued on Oct. 26, 1999 to Schave shows an electrically heated hose 22 for hot melt mix applications including a heating element 30 and a temperature sensor 122 (FIGS. 4, 4A).

U.S. Pat. No. 4,553,023 entitled "Thermally Insulated Electrically Heated Hose for Transmitting Hot Liquids" which issued on Nov. 12, 1985 to Jameson et al. provides an electrically heated hose 10 including Aramid thermal insulation 84, a Polytetrafluoroethylene tube 20 with a stainless steel wire braiding 21 and heater wires (23a-23d)(FIGS. 1-3).

U.S. Pat. No. 6,043,466 entitled "Hot Runner Heating Clamp," which issued on Mar. 28, 2000 to Jenko et al. has a system for clamping a heater to a cylindrical member including a heater coil 120 with coiled portions (122, 14) and a removable thermocouple 128 (FIGS. 7A-7C).

Thus, there is a need for a hose having a heating element which eliminates the shortcomings of the prior art.

SUMMARY OF THE INVENTION

It is an object of this invention to provide a bendable, non-kinking hose with heating element.

It is an further object of this invention to provide a hose with a heating element and a thermocouple which allows a user to control the final temperature of the liquid flowing through the hose.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
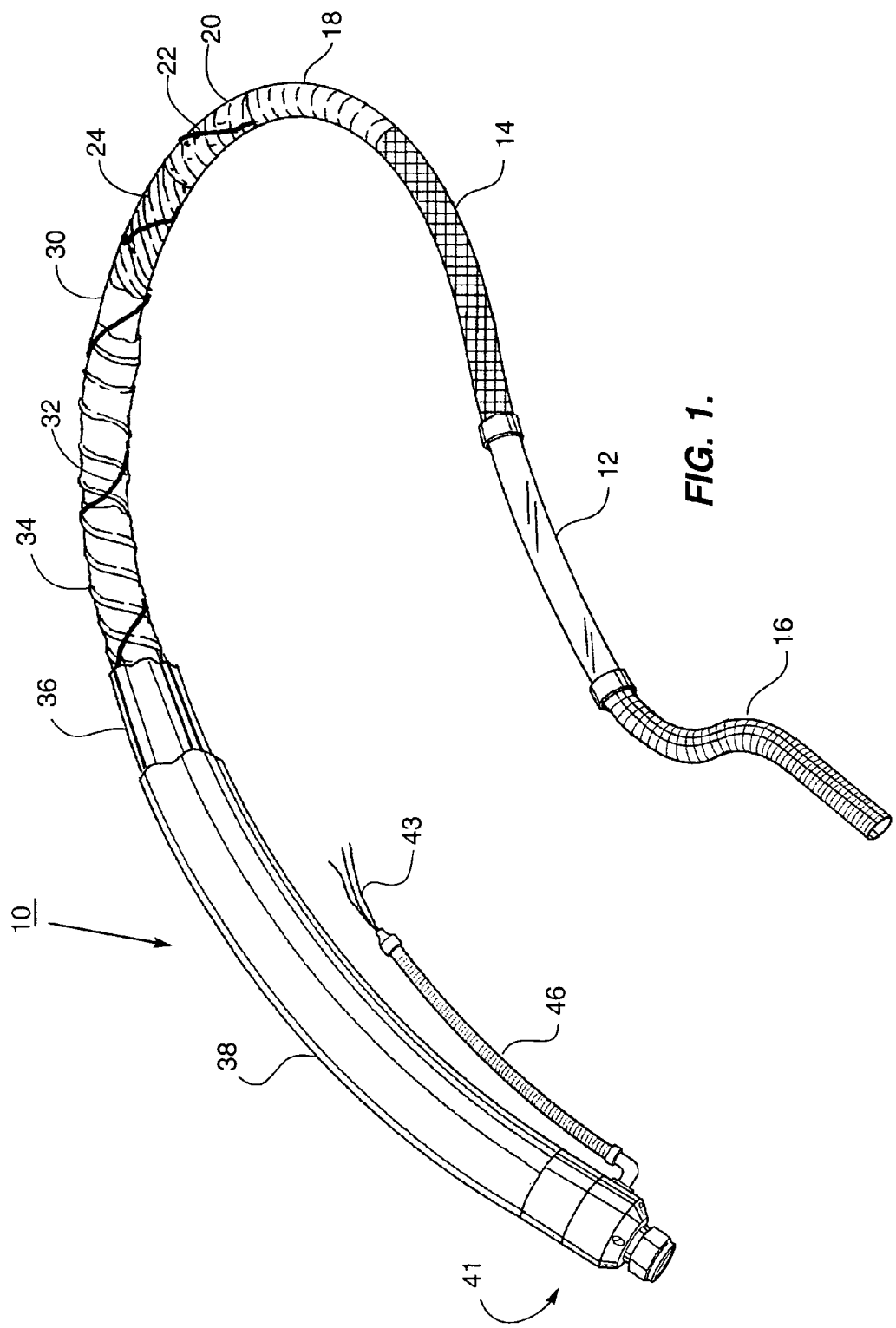
FIG. 1 is a partial cut away perspective view of a hose incorporating the present invention.
Figure 2:
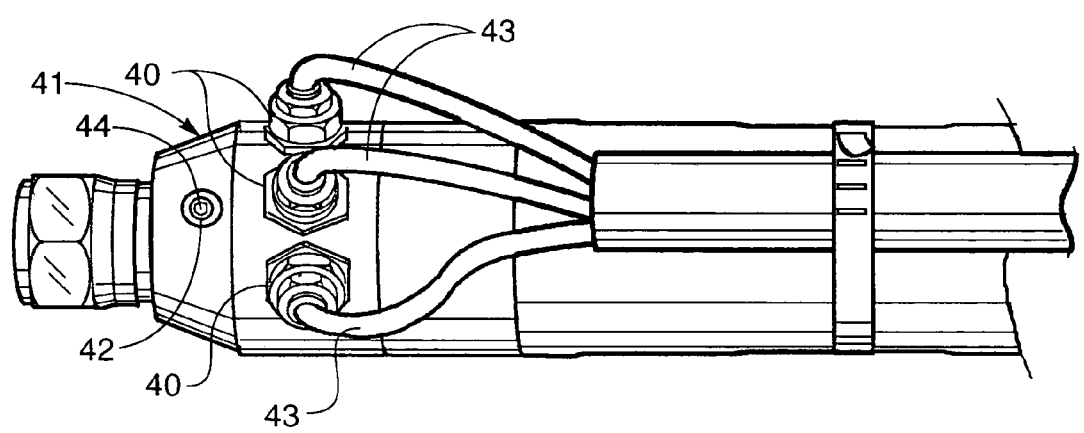
FIG. 2 is a side view of a fitting used in the present invention.
Figure 3:
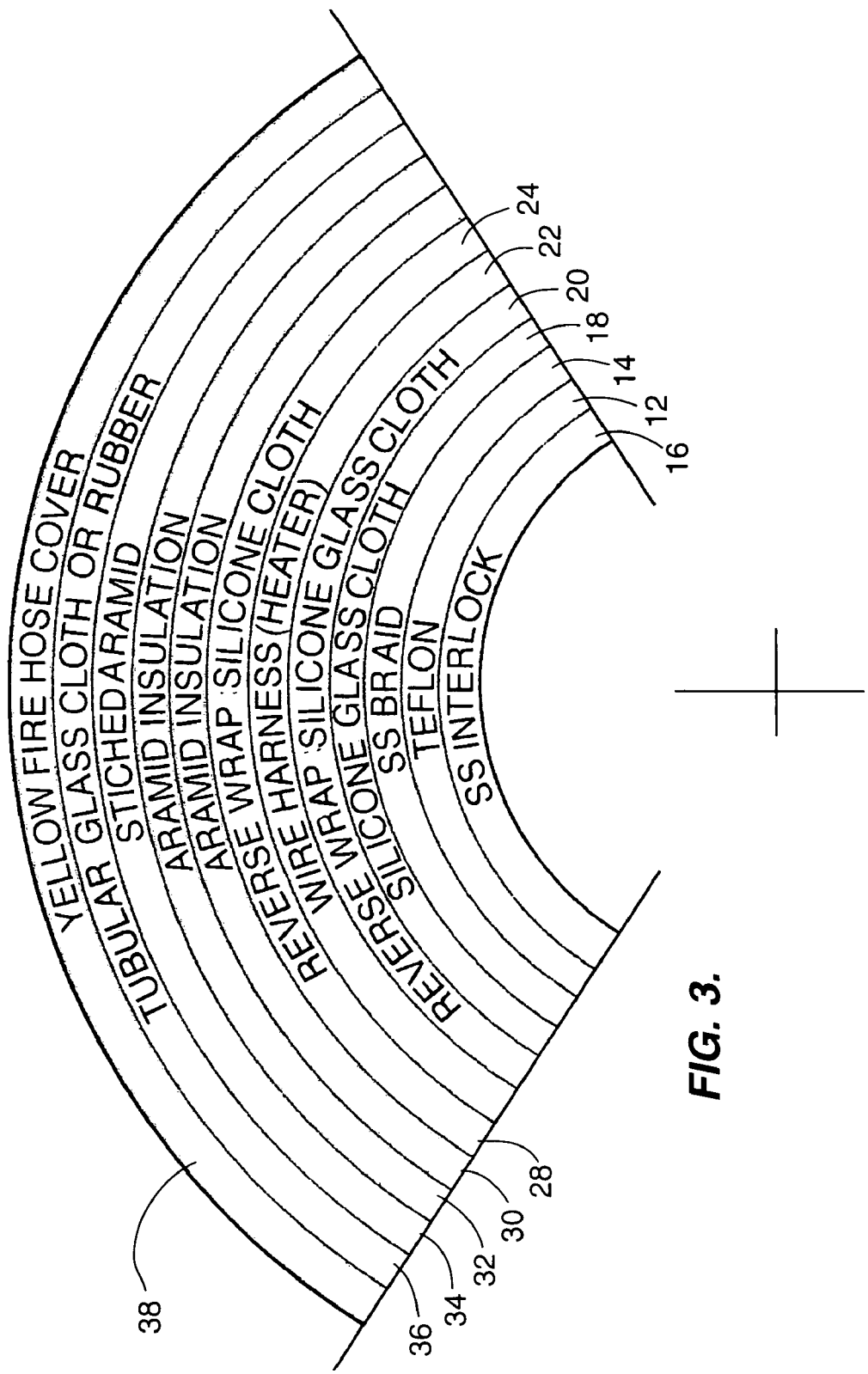
FIG. 3 is a cross sectional schematic view (not to scale) showing the various layers making up the hose of the present invention.

Referring more particularly to the drawings by characters of reference, FIGS. 1-3 disclose combinations of features which constitute the components of a hose 10 of the present invention. The presently preferred embodiment illustrated in FIGS. 1-3 of hose 10 is used to pump asphalt in applications as road construction. Hose 10 is constructed to minimize current problems in this operation, namely, hose kinking and/or collapsing and facilitating easy removal/replacement of thermocouples.

As best illustrated in FIG. 3, hose 10 starts with a hose construction adapted to prevent kinking and collapse of the hose. In the preferred embodiment, the hose interior most hose construction is a polytetrafluoroethylene layer 12 which is surrounded by stainless steel (SS) braid 14. A stainless steel interlock layer 16 is inserted into the interior of that construction as described below. This hose construction is one key to the invention as it prevents kinking and collapse of the hose in use. Those skilled in the art will recognize that other materials are suitable for use besides stainless steel, for example, carbon steel.

A heating element having abrasion protection is next wrapped around stainless steel braid layer 14. In the preferred embodiment, the heating element is made of one layer 18 of silicone glass cloth which is wrapped round same and a second layer 20 of silicone glass cloth which is wrapped around layer 18 but in the reverse direction. After silicone glass cloth layers 18 and 20, a wire harness 22 which is a tape 24 having one or more heater wires 26 inserted therein is wrapped around said silicone glass cloth layers. Wires 26, when connected to a source of electrical power, heat hose 10 to keep the asphalt flowing. A third silicone glass layer 28 is wrapped around wire harness 22 thereby binding the previous layers together.

Silicone glass layers 18, 20 and 28, in combination, form a protection layer which prevents abrasive chaffing of wire harness 22. In addition, by placing silicone glass layers 18, 20 and 28 in close proximity to the interior of hose 10, heat transfer from wire harness 22 to the material flowing therethrough is enhanced.

After binder layer 28, an insulator is provided. In the preferred embodiment, two insulation layers 30 and 32, preferably of ⅛ inch aramid insulation, are provided for purposes of heat retention. After insulation layers 30 and 32, a layer 34 of stitched aramid is provided whose purpose is to bind the previous aramid layers 30 and 32 to hose 10.

A moisture barrier is next provided which in the preferred embodiment is a tubular glass cloth silicon or rubber 36 in which the prior layers are concentrically contained. The last layer is a safety and containment layer which, in the presently preferred embodiment, is a yellow fire hose cover 38. Fire hose cover provides for safety and containment in the event of a breach of the previous layers.

As shown in FIG. 2, a hose fitting 41 attached to one end of hose 10 includes three connectors 40 for attaching electrical wires 43 which provide electrical power to heater wires 36. Electrical wires 43 are preferably covered by conduit 46 as shown in FIG. 1 when operational.

In addition, hose fitting 41 includes at least one screwed threading 42 to which a thermocouple (or other heat sensor) 44 is adapted to be removably inserted. Such ease in removal and replacement addresses one major cause of hose failure, namely, damage to the heat sensor 44.

Although only certain embodiments have been illustrated and described, it will be apparent to those skilled in the art that various changes and modifications may be made therein without departing from the spirit of the invention or from the scope of the appended claims.

What is claimed is:

1. A hose for pumping heated liquids therethrough, the hose comprising, in combination,
    an interior hose construction adapted to prevent kinking and collapse of said hose, the interior hose construction comprising a metal interlock layer through which liquids flow, the metal interlock layer being surrounded by a polytetrafluoroethylene layer, the polytetrafluoroethylene layer being surrounded by a metal braid;
    a heating element having abrasive protection layers associated therewith, the heating element surrounding the interior hose construction;
    an insulator, the insulator surrounding the heating element;
    a moisture barrier, the moisture barrier surrounding the insulator;
    a safety and containment barrier, the safety and containment barrier surrounding the moisture barrier; and
    at least two hose fittings at each end of said hose, at least one of said hose fittings having electrical connections in electrical communication with the heating element and a source of electrical power.

2. The hose of claim 1 wherein the metal is stainless steel.

3. The hose of claim 1 wherein the metal is carbon steel.

4. The hose of claim 1 wherein the heating element is a wire harness and the abrasive protection layers are one or more layers of silicone glass cloth.

5. The hose of claim 4 wherein the wire harness is a tape having one or more heating wires contained therein.

6. The hose of claim 4 having a first, a second and a third layer of silicone glass cloth, the first layer of the silicone glass cloth being wrapped around the hose construction, the second layer of the silicone glass cloth being reverse wrapped around the first layer, the wire harness being wrapped around the second layer and the third layer being wrapped around the wire harness.

7. The hose of claim 1 wherein the insulator comprises one or more layers of aramid.

8. The hose of claim 7 wherein the insulator comprises two layers of aramid and one layer of stitched aramid.

9. The hose of claim 1 wherein the moisture barrier is a tubular silicone glass cloth.

10. The hose of claim 1 wherein the moisture barrier is a tubular rubber.

11. The hose of claim 1 wherein the safety and containment layer is a fire hose cover.

12. The hose of claim 1 wherein the at least one hose fitting has three connectors.

13. The hose of claim 1 wherein at least one fitting has a thermocouple connection thereon which releasably received a thermocouple thereon, the thermocouple measuring the temperature of the liquid flowing through the hose.

14. A hose for pumping heated liquids therethrough, the hose comprising, in combination,
    an interior hose construction adapted to prevent kinking and collapse of said hose, the interior hose construction comprising a metal interlock layer through which liquids flow, the metal interlock layer being surrounded by a polytetrafluoroethylene layer, the polytetrafluoroethylene layer being surrounded by a metal braid;
    a heating element having abrasive protection layers associated therewith, the heating element being a tape having one or more heating wires contained therein, and the abrasive protection layers are a first, a second and a third layer of silicone glass cloth, the first layer of the silicone glass cloth being wrapped around the metal braid, the second layer of the silicone glass cloth being reverse wrapped around the first layer, the wire harness being wrapped around the second layer and the third layer being wrapped around the wire harness;
    an insulator, the insulator comprising two layers of aramid and one layer of stitched aramid surrounding the third layer of silicone glass cloth,
    a moisture barrier surrounding the insulator;
    a fire hose cover surrounding the moisture barrier; and
    at least two hose fittings at each end of said hose, at least one of said hose fittings having three electrical connections in electrical communication with the heating element and a source of electrical power and a thermocouple connection thereon which releasably receives a thermocouple thereon, the thermocouple measuring the temperature of the liquid flowing through the hose.

15. The hose of claim 14 wherein the metal is stainless steel.

16. The hose of claim 14 wherein the metal is carbon steel.

17. The hose of claim 14 wherein the moisture barrier is a tubular silicone glass cloth.

18. The hose of claim 14 wherein the moisture barrier is a tubular rubber.

* * * * *